(12) United States Patent
Kimura et al.

(10) Patent No.: US 9,566,662 B2
(45) Date of Patent: Feb. 14, 2017

(54) METHOD FOR MANUFACTURING MILL ROLL, MILL ROLL AND MANUFACTURING APPARATUS OF MILL ROLL

(71) Applicant: FUJICO CO., LTD., Kitakyushu-shi, Fukuoka (JP)

(72) Inventors: Kenji Kimura, Kitakyushu (JP); Akio Sonoda, Kitakyushu (JP); Hiroshi Yoshinaga, Kitakyushu (JP); Hideaki Nagayoshi, Kitakyushu (JP)

(73) Assignee: FUJICO CO., LTD., Kitakyushu-shi, Fukuoka (JP)

( * ) Notice: Subject to any disclaimer, the term of this patent is extended or adjusted under 35 U.S.C. 154(b) by 0 days.

(21) Appl. No.: 14/405,451

(22) PCT Filed: Apr. 8, 2014

(86) PCT No.: PCT/JP2014/060184
§ 371 (c)(1),
(2) Date: Dec. 4, 2014

(87) PCT Pub. No.: WO2014/168142
PCT Pub. Date: Oct. 16, 2014

(65) Prior Publication Data
US 2016/0023300 A1    Jan. 28, 2016

(30) Foreign Application Priority Data

Apr. 11, 2013   (JP) ................................. 2013-082965

(51) Int. Cl.
*B23K 20/12* (2006.01)
*B23K 20/24* (2006.01)
(Continued)

(52) U.S. Cl.
CPC ............. *B23K 20/129* (2013.01); *B21B 27/03* (2013.01); *B23K 20/12* (2013.01); *B23K 20/24* (2013.01);
(Continued)

(58) Field of Classification Search
CPC ........ B21B 27/00; B21B 27/03; B21B 27/055; B23K 31/02; B23K 20/24; B23K 20/12; B23K 2201/20; Y10T 29/49547; Y10T 29/49544; Y10T 29/49556
See application file for complete search history.

(56) References Cited

U.S. PATENT DOCUMENTS 3,599,857 A * 8/1971 Loyd ...................... B23K 20/12
                                                              156/73.5
4,060,190 A * 11/1977 Paolini ................. B23K 20/129
                                                              228/102
(Continued)

FOREIGN PATENT DOCUMENTS

CN           1249978 A       4/2000
CN        201618915 U       11/2010
(Continued)

OTHER PUBLICATIONS

International Search Report dated Jul. 15, 2014, issued in corresponding application No. PCT/JP2014/060184.
(Continued)

*Primary Examiner* — Jason L Vaughan
(74) *Attorney, Agent, or Firm* — Westerman, Hattori, Daniels & Adrian, LLP

(57) ABSTRACT

A method for manufacturing a mill roll including a preheating process for joining end portions 16 to 19 of a roll barrel member 13 and/or shaft materials 14, 15, and a friction pressure welding process strongly pressing and joining the shaft materials 14, 15 to a core material 11 after frictionally (Continued)

heating the joining end portions 16 to 19 by rotating the shaft materials 14, 15 while pressing to the core material 11, and a manufacturing apparatus including first and second holding means 29, 23 for the roll barrel member 13 and the shaft materials 14, 15, a rotating means rotating the shaft materials 14, 15, a pressing means 24 pressing the core material 11 and the shaft materials 14, 15 in an axial direction, and a preheating means 31 preheating the joining end portions 16 to 19 of the roll barrel member 13 and the shaft materials 14, 15.

7 Claims, 7 Drawing Sheets

(51) Int. Cl.
  *B21B 27/03* (2006.01)
  *B23K 31/02* (2006.01)
  *B21B 27/05* (2006.01)

(52) U.S. Cl.
  CPC .............. *B23K 31/02* (2013.01); *B21B 27/055* (2013.01); *B23K 2201/20* (2013.01)

(56) References Cited

U.S. PATENT DOCUMENTS

| | | | | |
|---|---|---|---|---|
| 4,242,888 A * | 1/1981 | Komeiji | ................. | F16D 3/207 228/114.5 |
| 4,609,577 A * | 9/1986 | Long | ................. | B23K 35/3086 420/34 |
| 4,721,153 A * | 1/1988 | Sano | ................. | B21B 27/00 148/500 |
| 5,240,167 A | 8/1993 | Ferte et al. | | |
| 5,270,124 A * | 12/1993 | Saxby | ................. | B21B 27/00 428/683 |
| 5,411,462 A * | 5/1995 | Link | ................. | B41F 31/26 492/30 |
| 5,713,408 A * | 2/1998 | Morando | ................. | C21D 9/563 164/135 |
| 5,837,967 A | 11/1998 | Sperling | | |
| 6,104,896 A * | 8/2000 | Zaman | ................. | G03G 15/751 29/407.08 |
| 6,212,349 B1 * | 4/2001 | Labombard | ................. | G03G 15/0818 399/286 |
| 6,637,642 B1 * | 10/2003 | Lingnau | ................. | B23K 13/00 219/601 |
| 6,716,148 B1 * | 4/2004 | Fortin | ................. | B41F 31/26 29/895.22 |
| 7,464,467 B2 * | 12/2008 | Fukuyama | ................. | B65H 27/00 29/895 |
| 8,622,188 B2 * | 1/2014 | Yamaoka | ................. | C21D 1/00 193/37 |
| 9,044,807 B2 * | 6/2015 | Oda | ................. | B21B 27/032 |
| 2005/0067465 A1 * | 3/2005 | Mizutani | ................. | B23K 20/129 228/112.1 |
| 2006/0035082 A1 * | 2/2006 | Hattori | ................. | B21B 27/032 428/408 |
| 2009/0124475 A1 * | 5/2009 | Pickering | ................. | G03G 15/2053 492/47 |
| 2012/0280485 A1 * | 11/2012 | Stol | ................. | B23K 20/233 285/21.1 |
| 2014/0050519 A1 * | 2/2014 | Oiwa | ................. | B23K 20/12 403/270 |

FOREIGN PATENT DOCUMENTS

| | | |
|---|---|---|
| GB | 1008021 A | 10/1965 |
| JP | 62-267426 A | 11/1987 |
| JP | 62-280305 A | 12/1987 |
| JP | 2-38318 A | 8/1990 |
| JP | 4-224087 A | 8/1992 |
| JP | 5-270635 A | 10/1993 |
| JP | 7-75885 A | 3/1995 |
| JP | 7-208618 A | 8/1995 |
| JP | 9-504476 A | 5/1997 |
| JP | 10-281414 A | 10/1998 |
| JP | 2000-158020 A | 6/2000 |
| JP | 2004-66312 A | 3/2004 |
| JP | 2005-324204 A | 11/2005 |
| JP | 2009-19493 A | 1/2009 |
| JP | 2009-82953 A | 4/2009 |
| JP | 2012-55930 A | 3/2012 |
| JP | 2012-110968 A | 6/2012 |
| JP | 2012-228703 A | 11/2012 |
| KR | 20-0402669 Y1 | 12/2005 |

OTHER PUBLICATIONS

Office Action dated Mar. 17, 2016, issued in counterpart Korean Patent Application No. 10-2014-7033251, with English translation. (15 pages).

Notification of Reason for Refusal dated Mar. 10, 2015, issued in corresponding Japanese Patent Application No. 2014-545439, with English translation (14 pages).

Decision of Patent Grant dated May 19, 2015, issued in corresponding Japanese Patent Application No. 2014-545439 with English translation (6 pages).

Office Action dated Jul. 13, 2015, issued in counterpart Chinese Patent Application No. 201480001554.1, with English translation (16 pages).

* cited by examiner

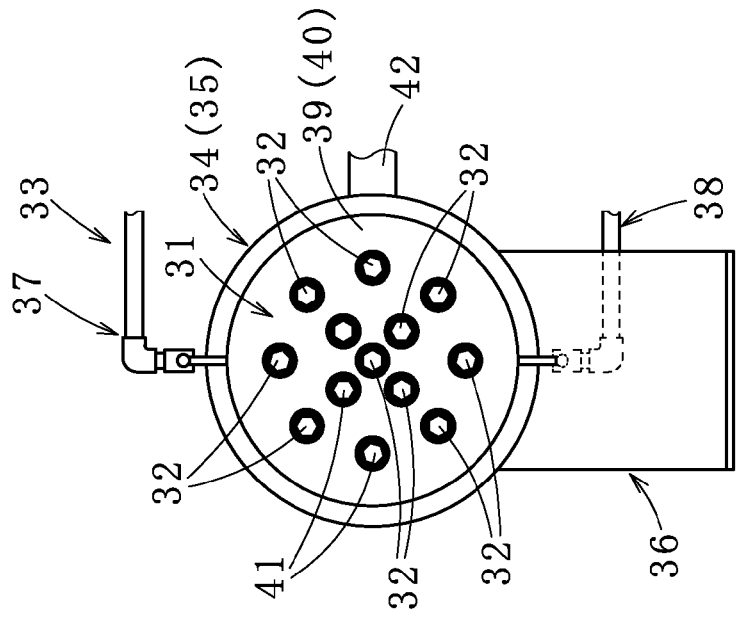
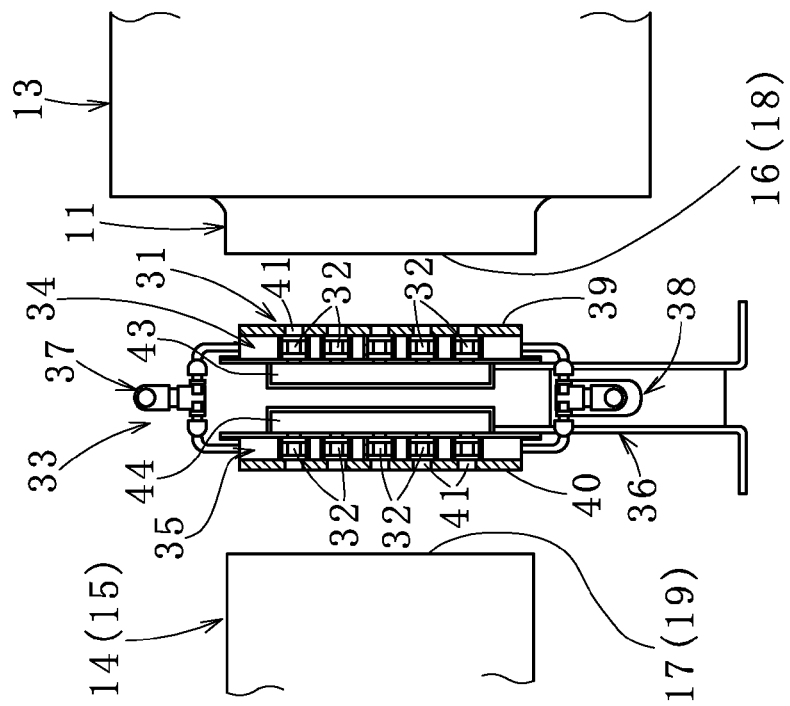
FIG. 3(A)
FIG. 3(B)

METHOD FOR MANUFACTURING MILL ROLL, MILL ROLL AND MANUFACTURING APPARATUS OF MILL ROLL

TECHNICAL FIELD

The present invention relates to a method for manufacturing a mill roll, a mill roll and a manufacturing apparatus of a mill roll for use in a rolling equipment for iron manufacture.

BACKGROUND ART

Conventionally, for example, in rolling of shaped steel, in order to upgrade the quality of rolled materials and to achieve labor-savings and energy-savings, mill rolls that can tolerate comparatively severe rolling conditions and have long lives have been in demand.

Due to this, for instance, as described in Patent Literature 1, mill rolls such as one in which a surface part of a roll barrel member is composed of hard metal (e.g., high-speed steel type multi-alloyed white cast iron) have been being used. This mill roll has been manufactured by removing a mill roll, in which a roll barrel member and shaft materials are integrated, from a material for rolls by scraping, the material for rolls being provided with a hard metal layer formed on an outer circumference of a core material, the shaft materials being singly provided on both sides in an axial direction of the roll barrel member.

However, when removing a mill roll having long shaft materials from a material for rolls by scraping, the amount of extra machining allowance at the time of removing by scraping increases, failing to shorten the manufacturing time. Also, running costs of cutting blades are incurred, which is uneconomical. Moreover, since it becomes impossible to manufacture a plurality of mill rolls from one material for rolls, for example, there is a need to prepare a new material for rolls, and it has been difficult to shorten the delivery time of and to reduce the manufacturing cost of mill rolls.

Therefore, for example, as with Patent Literature 2, there has been a proposal of a method for joining a roll barrel member and shaft materials by providing grooves singly to and arranging shaft materials singly on both sides of the roll barrel member and welding the respective grooves.

CITATION LIST

Patent Literature

Patent Literature 1: Japanese Unexamined Patent Application Publication No. 2000-158020
Patent Literature 2: Japanese Unexamined Patent Application Publication No. 2005-324204

SUMMARY OF INVENTION

Technical Problem

However, since mill rolls are used in rolling equipments for iron manufacture on which major loads are applied, when joining a roll barrel member and shaft materials, it is easy for the interfaces to be damaged, and it has been difficult to achieve a further extension of lives of mill rolls.

Additionally, in a technique described in Patent Literature 2, shaft materials are prone to being welded eccentrically or crookedly with respect to a roll barrel member, which makes post-welding stress relief necessary. Since it is difficult to perform the stress relief completely, there has been a need to use shaft materials that are somewhat thick.

The present invention has been made in view of the above circumstances, and an object thereof is to provide a method for manufacturing a mill roll, a mill roll, and a manufacturing apparatus of a mill roll in which a mill roll can be manufactured in a shortened work period and at a low cost and an ever-longer life of a mill roll can be achieved.

Solution to Problem

In order to achieve the above object, according to a first aspect of the present invention, there is provided a method for manufacturing a mill roll, including: a roll barrel member having a hard tinkering hardfacing layer formed on an outer circumference of a columnar core material consisting of chromium-molybdenum steel or carbon steel; and shaft materials consisting of chromium-molybdenum steel and being singly provided on both sides in an axial direction of the core material,
wherein
diameters of joining end portions of the shaft materials are made smaller than a diameter of the core material, the method further including:
a preheating process for preheating either one or both of at least joining end portions of the roll barrel member and the joining end portions of the shaft materials to a pre-set temperature; and
a friction pressure welding process for, with axial centers of the shaft materials aligned with an axial center of the core material, joining the core material and the shaft materials by strongly pressing the shaft materials to the core material after frictionally heating the joining end portions of the core material and the shaft materials by rotating the shaft materials while pressing the shaft materials to the core material.

In the method for manufacturing a mill roll according to the first aspect of the present invention, the diameters of the joining end portions of the shaft materials can be 0.86-fold or more and 0.96-fold or less of the diameter of the core material.

In the method for manufacturing a mill roll according to the first aspect of the present invention, it is preferred that the core material projects from end portions of the roll barrel member. A projection amount of 1 to 10 mm is enough in this case, however, the present invention is not limited to these numerical values.

In the method for manufacturing a mill roll according to the first aspect of the present invention, it is preferred that, after the friction pressure welding process, a metal surface is exposed by machining interfaces of the roll barrel member and the shaft materials, and circumferential welding is performed on the interfaces.

In the method for manufacturing a mill roll according to the first aspect of the present invention, it is preferred that a preheat temperature for the joining end portions in the preheating process is 500° C. or higher and a melting point of the shaft materials or lower.

In the method for manufacturing a mill roll according to the first aspect of the present invention, a used roll having the new tinkering hardfacing layer formed on the outer circumference of the roll barrel member can be used as the roll barrel member.

In the method for manufacturing a mill roll according to the first aspect of the present invention, it is preferred that the tinkering hardfacing layer on the outer circumference is partially or entirely removed from the used roll by machining after annealing.

In the method for manufacturing a mill roll according to the first aspect of the present invention, shaft materials cut off and separated from a used roll can be used as the shaft materials.

In order to achieve the above object, a mill roll according to a second aspect of the present invention is manufactured by the method for manufacturing a mill roll according to the first aspect of the present invention.

In order to achieve the above object, according to a third aspect of the present invention, there is provided a manufacturing apparatus of a mill roll used for the method for manufacturing a mill roll according to the first aspect of the present invention, including:

a first holding means for holding the roll barrel member horizontally or perpendicularly;
a second holding means for holding the shaft materials, the shaft materials being aligned with the axial center of the roll barrel member;
a rotating means provided to the second holding means for rotating the shaft materials centering on the axial centers of the shaft materials;
a pressing means provided to either the first holding means or the second holding means for pressing the core material and the shaft materials in the axial direction while joint surfaces of the core material and the shaft materials are facing one another; and
a preheating means for preheating the joining end portions of both the roll barrel member and the shaft materials.

In the manufacturing apparatus of a mill roll according to the third aspect of the present invention, it is preferred that the preheating means is composed of a plurality of burners each arranged facing the respective joining end portions of the roll barrel member and the shaft materials that are arranged opposed to one another with a space in between.

In the manufacturing apparatus of a mill roll according to the third aspect of the present invention, it is preferred that the plurality of burners arranged facing the joining end portions are arranged more densely in the central portions of the joining end portions than in the peripheral portions of the joining end portions.

In the manufacturing apparatus of a mill roll according to the third aspect of the present invention, it is preferred that a heat-resistant member is provided on the side of flame jetting ports of the plurality of burners.

In the manufacturing apparatus of a mill roll according to the third aspect of the present invention, it is preferred that the plurality of burners are provided with a water-cooling means.

In the manufacturing apparatus of a mill roll according to the third aspect of the present invention, the preheating means can alternatively be provided to a moving means movable between a preheating position and a non-preheating position, the preheating position preheating the joining end portions of the roll barrel member and the shaft materials, the non-preheating position being located lateral to the preheating position.

In the manufacturing apparatus of a mill roll according to the third aspect of the present invention, it is preferred that the preheating means has a burner and a robot arm, and determines a direction and a movement locus of the burner based on the robot arm, the burner simultaneously or serially heating the joining end portions of the roll barrel member and the shaft materials, the robot arm having the burner attached at the tip portion thereof.

In the manufacturing apparatus of a mill roll according to the third aspect of the present invention, it is preferred that the burner consists of a first burner and a second burner, the first burner preheating the joining end portions of the roll barrel member, the second burner preheating the joining end portions of the shaft materials.

Advantageous Effects of Invention

In the method for manufacturing a mill roll, the mill roll and the manufacturing apparatus of a mill roll according to the present invention, since the roll barrel member and the shaft materials are joined by the preheating process and the friction pressure welding process, a mill roll can be manufactured in a shortened work period and at a low cost, and an ever-longer life of a mill roll can be achieved.

Additionally, since the diameters of the joining end portions of the shaft materials are made smaller than the diameter of the core material, the core material and the shaft materials can be welded (friction pressure welding) in direct contact with one another with the axial centers surely aligned with one another, the core material consisting of chromium-molybdenum steel or carbon steel, the shaft materials consisting of chromium-molybdenum steel. Since the hard tinkering hardfacing layer on the outer side of the roll barrel member does not come into contact with the shaft materials, friction pressure welding that has enough joint strength for a mill roll and gives few buckles and deformations can surely be performed.

Especially, when the core material is projecting from the roll barrel member, the shaft materials do not come into contact with the hard tinkering hardfacing layer of the roll barrel member even more, and friction pressure welding can surely be performed.

Moreover, in the case of the manufacturing apparatus of a mil roll according to the present invention, when using the burner provided at the tip portion of the robot arm as the preheating means for preheating the joining end portions of the roll barrel member and the shaft materials, by controlling the robot arm, arbitrary spots of the roll barrel member and the shaft materials can be heated by the burner at arbitrary timing. Also, by changing a program of the robot arm, regions to be heated can be changed in conformity with a roll barrel member and shaft materials having arbitrary diameters.

BRIEF DESCRIPTION OF DRAWINGS

FIGS. 3(A) and 3(B) are a side sectional view and a front view, respectively, of a preheating means of a manufacturing apparatus of a mill roll used for the method for manufacturing a mill roll.

DESCRIPTION OF EMBODIMENTS

Next, with reference to the accompanying drawings, descriptions will be given on embodiments of the present invention for a better understanding of the present invention.

Figure 1:
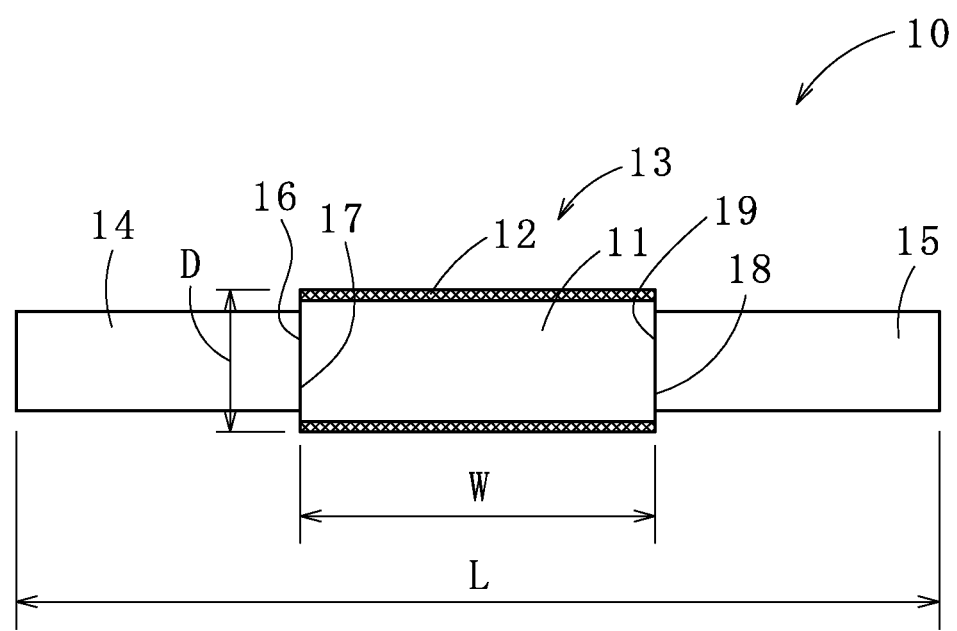
FIG. 1 is an explanatory diagram of a mill roll according to one embodiment of the present invention.
Figure 2:
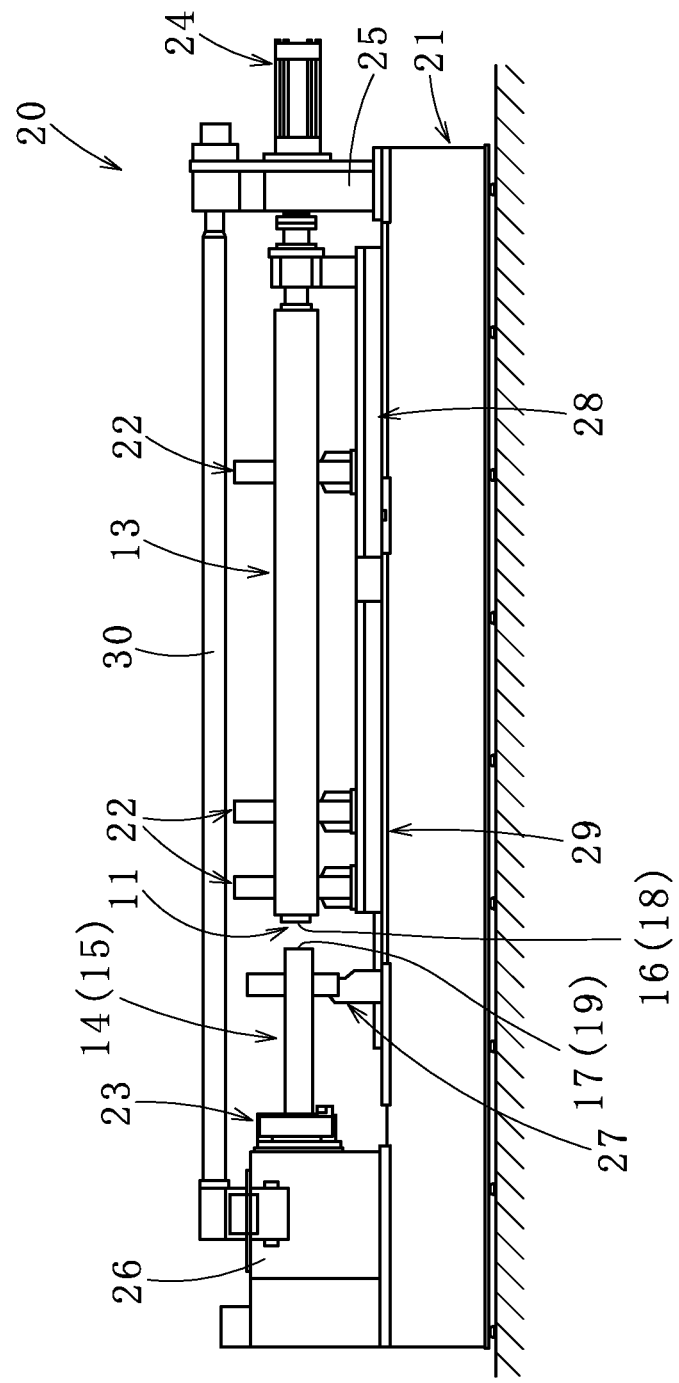
FIG. 2 is an explanatory diagram of a method for manufacturing a mill roll according to a first embodiment of the present invention.

First, with reference to FIG. 1, descriptions will be given on a mill roll 10 according to one embodiment of the present invention.

The mill roll 10 is used in the rolling of iron and steel, especially in hot rolling work and cold rolling work (rolling and straightening) of thin plates, steel bars, wire rods or shaped steel. The mill roll 10 is a roll having received a predetermined processing treatment in accordance with the intended purpose.

The mill roll 10 is provided with a roll barrel member 13 and shaft materials 14, 15, the roll barrel member 13 having a tinkering hardfacing layer 12 on an outer circumference of a columnar core material 11, the shaft materials 14, 15 each being provided on both sides in an axial direction of the core material 11.

Regarding the dimension of the mill roll 10, the outer diameter (barrel diameter) D of the roll barrel member 13 is, for example, about 300 to 900 mm, the width (barrel length) W is, for example, about 1500 to 2500 mm, and the total length L including the shaft materials 14, 15 is, for example, about 4000 to 7000 mm.

Here, the core material 11 of the roll barrel member 13 consists of chromium-molybdenum (Cr—Mo) steel or carbon steel, and the shaft materials 14, 15 consist of chromium-molybdenum (Cr—Mo) steel.

The tinkering hardfacing layer 12 formed on the outer circumference of the core material 11 consists of, for example, hard materials such as ferrous outer layer material (with hardness of shore (HS) of about 70 to 100) described in Japanese Unexamined Patent Application Publication No. 2012-110968 and high-speed steel type multi-alloyed white cast iron (an example of high-speed steels). The thickness of the tinkering hardfacing layer 12 can be changed variously depending on the intended purposes, however, the thickness thereof is, for example, about 50 to 150 mm.

Since the roll barrel member 13 can be manufactured by, for example, a method disclosed in Japanese Unexamined Patent Application Publication No. 2000-158020, descriptions will be omitted here.

The above mill roll 10 is made by separately forming the roll barrel member 13 and the shaft materials 14, 15, frictionally joining a joining end portion 16 and a joining end portion 17, and frictionally joining a joining end portion 18 and a joining end portion 19, the joining end portion 16 being provided on one side of the core material 11 of the roll barrel member 13, the joining end portion 17 being provided to the shaft material 14 on one side, the joining end portion 18 being provided on the other side of the core material 11, the joining end portion 19 being provided to the shaft material 15 on the other side.

However, as needed, it is possible to form only a shaft material on one side of a core material integrally with the core material by machining, to form only a shaft material on the other side of the core material separately from the core material, and to frictionally join joining end portions of the core material and the shaft material.

Since the shaft materials 14, 15 are frictionally joined to the roll barrel member 13 as just described, in order for the core material 11 and the shaft materials 14, 15 to be joined in good condition, the diameters (outer diameters) of the joining end portions 17, 19 of the shaft materials 14, 15 are made smaller than the diameter of the core material 11. More specifically, it is preferred that the diameters of the joining end portions 17, 19 of the shaft materials 14, 15 are 0.86-fold or more and 0.96-fold or less of the diameter of the core material 11.

Also, it is preferred that circumferential welding (build-up welding) is performed on the interfaces (boundary portions in a circumferential direction) of the roll barrel member 13 and the shaft materials 14, 15 for the reinforcement. For example, MIG welding method or TIG welding method in which a filler metal such as high tensile strength steel (hi-ten) is used can be applied to this welding.

Here, as the roll barrel member 13, an unused roll barrel member (unused item) can be used; however, a roll barrel member of a used roll (used item) can also be used. When using a used item, after cutting off and removing shaft materials on both sides (or one side) in an axial direction of the used roll, on the outer circumference of the obtained roll barrel member, machining is performed if necessary, and then a new tinkering hardfacing layer having the above-described structure becomes formed.

Additionally, in the same way, unused shaft materials (unused items) can be used as the shaft materials 14, 15, however, shaft materials of a used roll (used items) can also be used. When using used items, shaft materials cut off and separated from a used roll are machined (diameter reduction) as needed.

Next, with reference to FIGS. 1 to 4, descriptions will be given on a manufacturing apparatus of a mill roll (hereinafter also simply referred to as a manufacturing apparatus) 20 according to a first embodiment of the present invention. The manufacturing apparatus of a mill roll 20 includes a base stand 21, a plurality (here, the number is three) of clamps 22, a chuck (an example of second holding means) 23 and a hydraulic cylinder (an example of pressing means) 24, the plurality of clamps 22 being provided on the base stand 21 and holding the roll barrel member 13, the chuck 23 holding the shaft material 14 (or the shaft material 15, the same applies hereafter), the hydraulic cylinder 24 pressing the roll barrel member 13 held by the plurality of clamps 22 in an axial direction thereof.

A first supporting stand 25 provided with the hydraulic cylinder 24 is attached and fixed on the end of one side in a longitudinal direction of the base stand 21 (the side of the roll barrel member 13). A second supporting stand 26 provided with the chuck 23 is attached and fixed on the end of the other side in a longitudinal direction of the base stand 21 (the side of the shaft material 14).

The chuck 23 holds the base side of the shaft material 14 in a way that keeps the shaft material 14 in a horizontal state. The chuck 23 is provided with a speed reducer and a motor (not illustrated) which are examples of rotating means for rotating the shaft material 14 centering on the axial center of the shaft material 14. A steady rest means 27 is arranged at a position anterior to the chuck 23 (tip side of the shaft material 14), the steady rest means 27 controlling and further preventing the run-out of the axial center position of the shaft material 14 held by the chuck 23 when the shaft material 14 rotates.

Between the supporting stand 25 and the supporting stand 26 each arranged on the ends of both sides in a longitudinal direction of the base stand 21, there is a table 28 movable along the longitudinal direction of the base stand 21. On top of the table 28, the plurality of clamps 22 are attached and fixed in the longitudinal direction of the base stand 21 at intervals.

This enables the roll barrel member 13 and the shaft material 14 to be arranged horizontally on the base stand 21 with the axial centers of the roll barrel member 13 and the shaft material 14 aligned with each other.

Here, a first holding means 29 has the clamps 22 and the table 28. Also, the hydraulic cylinder 24 is in contact with the end of one side in a longitudinal direction of the table 28, which means that the hydraulic cylinder 24 is provided to the first holding means 29.

The roll barrel member 13 can thereby be pressed to the shaft material 14 through the first holding means 29 by using the hydraulic cylinder 24. Due to the pressing force, there is a possibility that a space between the upper parts of the supporting stand 25 and the supporting stand 26 becomes wider at this point, however, this can be prevented since the lower parts of the supporting stand 25 and the supporting stand 26 are connected by the base stand 21, and the upper parts are connected by a connecting rod 30.

As described above, the descriptions have been given on a case in which the roll barrel member 13 is pressed to the side of the shaft material 14 by the hydraulic cylinder 24 provided to the first holding means 29 here. However, considering the weight, length and the like of the roll barrel member 13, it is preferred that the shaft material 14 is pressed to the side of the roll barrel member 13 by fixing the arranging position of the roll barrel member 13 (without moving the position of the roll barrel member 13), attaching a chuck (and additionally, a steady rest means) to a table movable in the longitudinal direction of the base stand 21, and providing a hydraulic cylinder (an example of pressing means) to the chuck.

The pressing means is not limited to a hydraulic cylinder, and can be other things capable of pressing the core material 11 and the shaft material 14 in an axial direction such as a pneumatic cylinder and an electric cylinder.

As illustrated in FIGS. 2, 3(A), 3(B) and 4, there is a preheating means 31 provided in between the chuck 23 and the clamps 22.

The preheating means 31 is composed of a plurality of burners 32 arranged facing the respective joining end portions 16 and 17 of the roll barrel member 13 and the shaft material 14 (same applies to the shaft material 15), the roll barrel member 13 and the shaft material 14 being held by the clamps 22 and the chuck 23, respectively, and being arranged opposed to each other with a space in between. The preheating means 31 preheats both the joining end portion 16 of the roll barrel member 13 and the joining end portion 17 of the shaft material 14 to a pre-set temperature.

As illustrated in FIGS. 3(A) and 3(B), the preheating means 31 is provided with a water-cooling means 33.

The water-cooling means 33 has a disk-shaped water-cooling jacket 34 and a disk-shaped water-cooling jacket 35, the water-cooling jacket 34 being arranged opposed to the joint surface of the core material 11 of the roll barrel member 13 with a space in between, the water-cooling jacket 35 being arranged opposed to the joint surface of the shaft material 14 with a space in between. These water-cooling jackets 34, 35 are singly attached and fixed to both sides in a thickness direction of a mounting stand 36 with axial centers of the water-cooling jackets 34, 35 aligned with each other, and the plurality of burners 32 are attached and fixed to each of these water-cooling jackets 34, 35. Pipe arrangements 37, 38 are connected to the upper and lower portions of the water-cooling jackets 34, 35, the pipe arrangements 37, 38 delivering water to and draining water from the water-cooling jackets 34, 35.

Also, ceramic (e.g., alumina) heat-resistant plates (an example of heat-resistant members) 39, 40 are individually provided on the obverse surface sides of each of the water-cooling jackets 34, 35, i.e., the side of the flame jetting ports of the plurality of burners 32 (the side of the surface opposed to the joint surface of the roll barrel member 13 and the side of the surface opposed to the joint surface of the shaft material 14). Additionally, opening portions 41 are formed in the heat-resistant plates 39, 40 in conformity with the positions of the flame jetting ports of each of the burners 32.

On the other hand, there are gas supply chambers 43, 44 individually provided on the reverse surface sides of each of the water-cooling jackets 34, 35, the gas supply chambers 43, 44 supplying gas delivered from a gas supply tube 42 to each of the burners 32.

By providing the water-cooling means 33 and the heat-resistant plates 39, 40 to the plurality of burners 32 as just described, it becomes possible to control and even prevent the case in which the fitting portions of the burners 32 become deformed or even melted as a result of reaching a high temperature due to the flame of the burners 32 recoiling on each joint surface in the middle of preheating both the joining end portion 16 of the roll barrel member 13 and the joining end portion 17 of the shaft material 14 by the plurality of burners 32.

Here, the descriptions have been given on the case in which the plurality of burners 32 are provided with both the water-cooling means 33 and the heat-resistant plates 39, 40, however, depending on the usage condition of the burners 32 (such as a preheat temperature), it is possible to use neither, or to use only either one of the water-cooling means 33 and the heat-resistant plates 39, 40.

Figure 4:
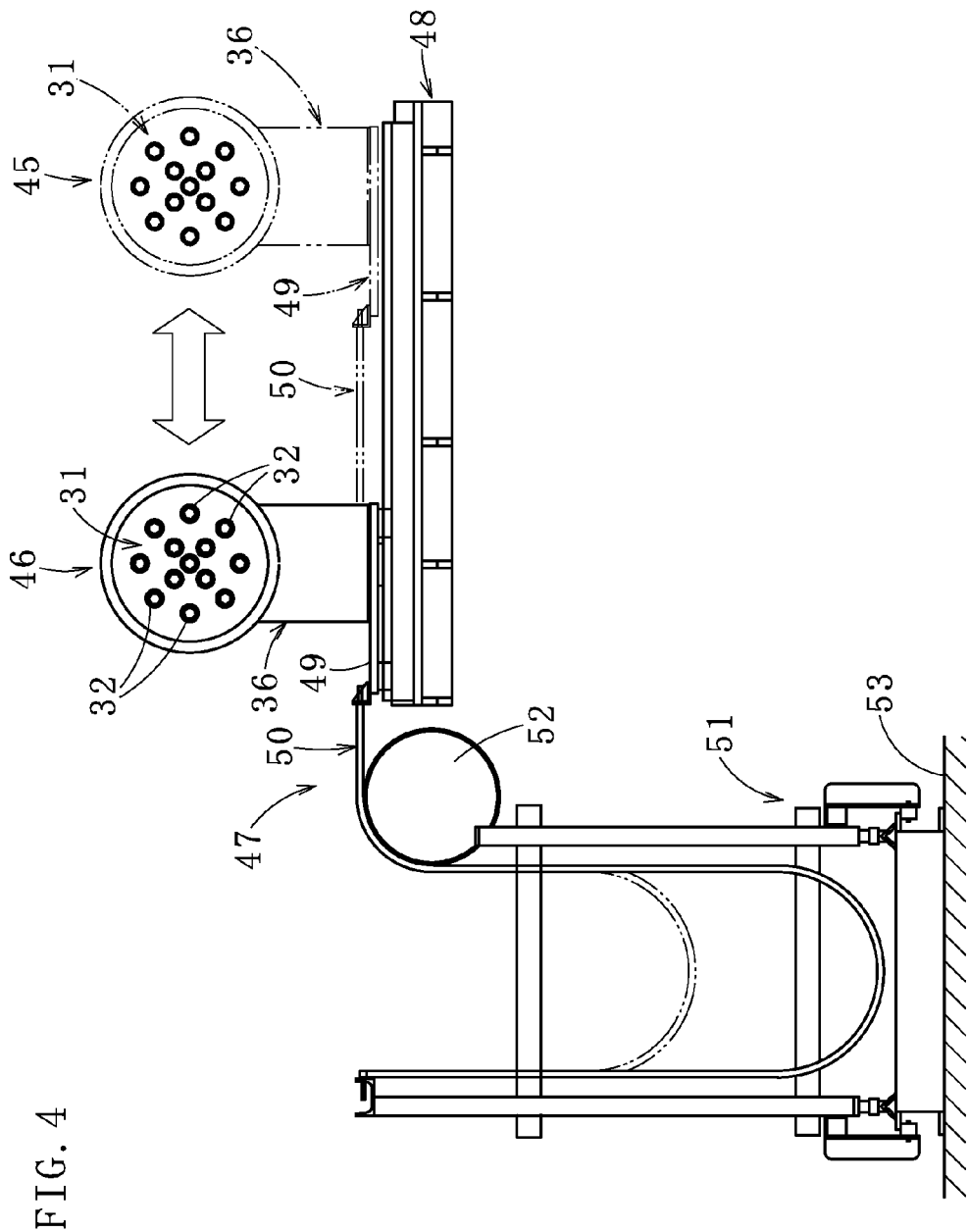
FIG. 4 is a front view of a driving means provided with the preheating means.

As illustrated in FIGS. 3(B) and 4, the plurality of burners 32 are arranged at the axial center position of the water-cooling jacket 34 (the same applies to the water-cooling jacket 35) and concentrically arranged centering on the axial center position of the water-cooling jacket 34. Especially, in this embodiment, since the shaft material 14 (the same applies to the shaft material 15) is frictionally joined to the roll barrel member 13, in order for the core material 11 and the shaft material 14 to be joined in good condition, the plurality of burners 32 arranged facing the respective joining end portions 16, 17 are arranged more densely in the central portions (axial center portions) of the joining end portions 16, 17 (water-cooling jackets 34 and 35) than the peripheral portions thereof.

The temperature can thereby be made higher in the central portions of the respective joining end portions 16, 17 than in the peripheral portions thereof.

Here, the descriptions have been given on the case in which the plurality of burners 32 are used as the preheating means 31, however, the preheating means 31 is not limited to a plurality of burners, and for example, an electromagnetic induction heating coil and the like can be used as well.

As illustrated in FIG. 4, the preheating means 31 is provided to a moving means 47 that enables moves between a preheating position 45 (the position illustrated by chain double-dashed lines in the preheating means 31 in FIG. 4) and a non-preheating position 46 (the position illustrated by solid lines in the preheating means 31 in FIG. 4, i.e., a standby position), the preheating position 45 preheating the joining end portions 16, 17 of the roll barrel member 13 and the shaft material 14 (the same applies to the shaft material 15), the non-preheating position 46 being located lateral to the preheating position 45.

The moving means 47 has a guide rail 48 and a carrying stand 49, the guide rail 48 being arranged extending between the preheating position 45 and the non-preheating position 46, the carrying stand 49 being travelable on the guide rail 48 and having the lower end portion of the mounting stand 36 of the preheating means 31 attached and fixed thereto.

The preheating means 31 can thereby be made to reciprocate between the preheating position 45 and the non-preheating position 46.

The moving means 47 is provided with a gas supply hose 50 that supplies gas to the burners 32 of the preheating means 31.

The tip end portion of the gas supply hose 50 is connected to the carrying stand 49 and structured to be capable of supplying gas to the gas supply tube 42 connected to the carrying stand 49. On the other hand, the base end portion of the gas supply hose 50 is connected to a carriage 51 made travelable on the side of the base stand 21 and in parallel with the base stand 21.

When the preheating means 31 reciprocates between the preheating position 45 and the non-preheating position 46, the gas supply hose 50 is supported and guided by a guide roller 52 (looper mechanism), which prevents the gas supply hose 50 from touching a floor surface 53.

The manufacturing apparatus of a mill roll 20 is also provided with a thermometer, a torque detector, a pressure gauge and the like, the thermometer measuring temperatures of the preheated roll barrel member 13 and the preheated shaft material 14, the torque detector detecting torque at the time of pressing the core material 11 and the shaft material 14, the pressure gauge measuring a pressure applied at the time of pressing.

Respective functions of the above motor, the above hydraulic cylinder 24 and the above preheating means 31 can be controlled by a control apparatus (not illustrated). The control apparatus also supervises each value measured by the thermometer, the torque detector and the pressure gauge, and is capable of controlling respective performances of the motor, the hydraulic cylinder 24 and the preheating means 31 based on these measured values.

Therefore, after making the joint surfaces of the core material 11 and the shaft materials 14, 15 face to face with one another under a condition where the axial centers of the preheated shaft materials 14, 15 are aligned with the axial center of the preheated core material 11, rotating the chuck 23 (the shaft materials 14, 15) by the motor while pressing the core material 11 to the shaft materials 14, 15 by the hydraulic cylinder 24, and frictionally heating the joining end portions 16 to 19 of the core material 11 and the shaft materials 14, 15, the core material 11 can be strongly pressed and joined to the shaft materials 14, 15 by the hydraulic cylinder 24. Additionally, strong pressing can also be performed by that which is other than the hydraulic cylinder 24.

Figure 5:
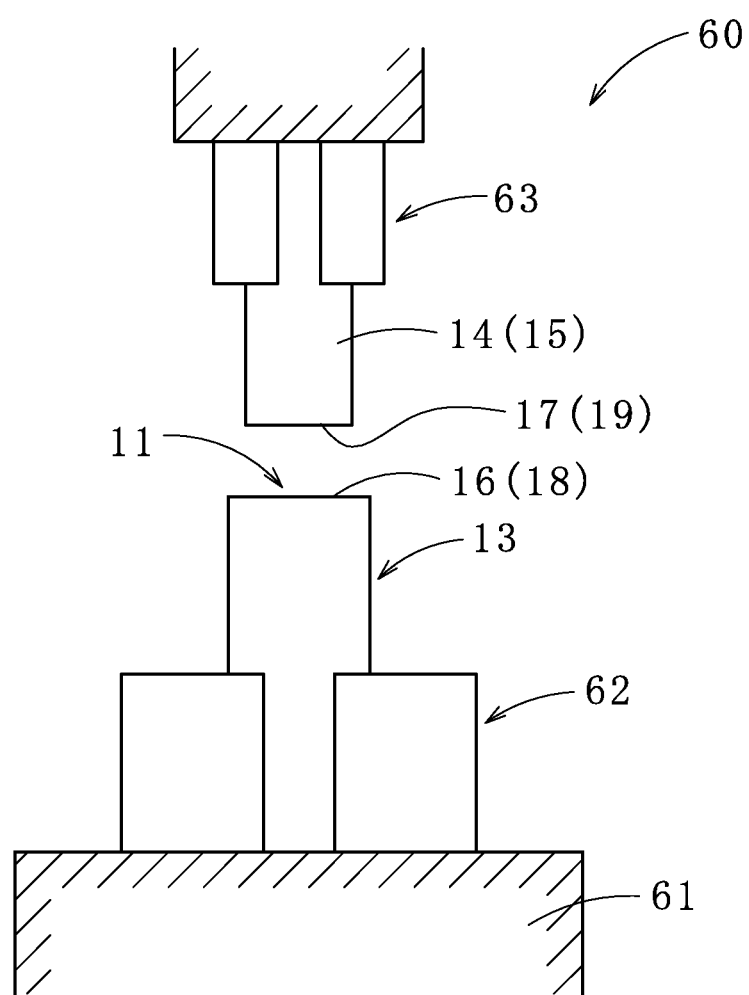
FIG. 5 is an explanatory diagram of a method for manufacturing a mill roll according to a second embodiment of the present invention.

Next, with reference to FIGS. 1 and 5, descriptions will be given on a manufacturing apparatus of a mill roll (hereinafter also simply referred to as a manufacturing apparatus) 60 according to a second embodiment of the present invention.

The manufacturing apparatus of a mill roll 60 includes a base stand 61, a clamp (an example of first holding means) 62 and a chuck (an example of second holding means) 63, the clamp 62 being provided on the base stand 61 and holding the roll barrel member 13, the chuck 63 holding the shaft material 14 (or the shaft material 15, the same applies hereafter).

The clamp 62 holds the roll barrel member 13 with the axial center of the core material 11 in a perpendicular direction. The chuck 63 is arranged above the clamp 62 so that the axial center of the shaft material 14 held by the chuck 63 becomes aligned with the axial center of the core material 11 (i.e., so that the axial center of the shaft material 14 lies in a perpendicular direction).

The above chuck 63 is provided with a motor (not illustrated) that is an example of rotating means for rotating the shaft material 14 held by the chuck 63 centering on the axial center of the shaft material 14.

The chuck 63 is further provided with an unillustrated pressing means (e.g., a hydraulic cylinder and the like), the pressing means making the shaft material 14 held by the chuck 63 perform vertical motions with respect to the roll barrel member 13 held by the clamp 62 and pressing the core material 11 and the shaft materials 14, 15 in the axial direction with the joint surfaces of the core material 11 and the shaft materials 14, 15 facing one another. A pressing means can alternatively be provided to the side of a clamp.

There is a preheating means (not illustrated) provided between the chuck 63 and the clamp 62. That which has a similar function as that of the earlier-described preheating means 31 can be used as the preheating means.

As with the manufacturing apparatus of a mill roll 20 described earlier, the manufacturing apparatus of a mill roll 60 is provided with a thermometer, a torque detector, and even a pressure gauge and the like.

Respective performances of the above motor, the above pressing means and the above preheating means can be controlled by a control apparatus (not illustrated). The control apparatus also supervises each value measured by the thermometer, the torque detector and the pressure gauge, and is capable of controlling respective performances of the motor, the pressing means and the preheating means based on these measured values.

Therefore, after making the joint surfaces of the core material 11 and the shaft materials 14, 15 face to face with one another under a condition where the axial centers of the shaft materials 14, 15 are aligned with the axial center of the preheated core material 11, rotating the chuck 63 (the shaft materials 14, 15) by the motor while pressing the shaft materials 14, 15 to the core material 11 by the pressing means, and frictionally heating the joining end portions 16 to 19 of the core material 11 and the shaft materials 14, 15, the shaft materials 14, 15 can be strongly pressed and joined to the core material 11 by the pressing means.

Next, with reference to FIGS. 1 to 4, descriptions will be given on a method for manufacturing a mill roll according to the first embodiment of the present invention.

Methods for manufacturing a mill roll include a preparatory process, a preheating process, a friction pressure welding process and a finishing process.

First, descriptions will be given on the preparatory process.

In the preparatory process, the roll barrel member 13 and the shaft materials 14, 15 are prepared.

When using an unused roll barrel member (unused item) as the roll barrel member 13, a long core material having the same diameter as that of the core material 11 (a core material having a length equal to a plurality of core materials 11) is firstly manufactured by machining a long material for rolls (Cr—Mo steel or carbon steel). Next, after forming the tinkering hardfacing layer 12 on the outer circumference of the manufactured long core material, the roll barrel member 13 is obtained by cutting off this long core material.

A shaft material on only one side of a core material may be formed integrally with the core material by machining from a material for rolls.

When using a roll barrel member of a used roll (used item) as the roll barrel member 13, after cutting off and removing shaft materials on both sides in an axial direction of the used roll, a new tinkering hardfacing layer 12 is formed on the outer circumference of the obtained roll barrel member. It is preferred that the new tinkering hardfacing layer 12 is formed by removing part of or the entire existing tinkering hardfacing layer on the outer circumference (with the remaining thickness of 0 mm or more than 0 mm and about 30 mm or less) by machining after annealing a roll barrel member in which shaft materials on both sides in an axial direction of a used roll are cut off and removed.

Additionally, a shaft material on only one side of a mill roll could be cut off from a used roll.

Here, it is preferred that projecting portions (projection amount in the axial center direction: e.g., about 1 to 100 mm, more preferably, 2 to 10 mm) having diameters equal to or larger than the diameters of the shaft materials 14, 15 are preliminarily formed in the joining end portions 16 and 18 of the above roll barrel member 13 (the core material 11) to be joined to the shaft materials 14, 15.

When using an unused shaft material (unused item) as the shaft material 14 (the same applies to the shaft material 15), the shaft material 14 in which the end face of the joining end portion 17 is flat is obtained by machining/cutting off (machining and cutting off) a material for rolls (Cr—Mo steel).

When using a shaft material of a used roll (used item), a shaft material cut off and separated from a used roll is machined (diameter reduction) as needed. In this case, as with the above roll barrel member of the used roll, it is preferred to preliminarily anneal before machining.

Here, the diameter of the joining end portion 17 of the shaft material 14 is made smaller than that of the core material 11 (0.86- to 0.96-fold of the diameter of the core material 11).

The roll barrel member 13 and the shaft materials 14, 15 obtained by the above method are carried to the manufacturing apparatus of a mill roll 20, the clamps 22 are made to hold the roll barrel member 13 and the chuck 23 is made to hold the shaft material 14 (the same applies to the shaft material 15).

Here, the relative position of the clamps 22 and the chuck 23 is also adjusted in order to make the axial center of the core material 11 of the roll barrel member 13 and the axial center of the shaft material 14 aligned with each other.

Next, descriptions will be given on the preheating process.

In the preheating process, the joining end portion 16 of the roll barrel member 13 and the joining end portion 17 of the shaft material 14 (or the shaft material 15, the same applies hereafter) are preheated to a pre-set temperature by the earlier-described preheating means 31.

First, the carrying stand 49 of the moving means 47 is moved, and the preheating means 31 located at the non-preheating position 46 is moved to the preheating position 45 (position where the preheating means 31 becomes arranged facing the respective joining end portions 16, 17 of the roll barrel member 13 and the shaft material 14).

Next, the joining end portions 16, 17 are preheated to the above-described temperature.

Since the earlier-described preheating means 31 is used in the preheating, the temperatures rise higher in the central portions of the respective joining end portions 16, 17 of the core material 11 and the shaft material 14 than in the peripheral portions thereof (e.g., the temperatures are made higher in the central portions than in the peripheral portions within the range of 50 C.° or higher and 150 C.° or lower). Projection amount in an axial center direction in the central portions of the respective joining end portions 16, 17 of the core material 11 and the shaft material 14 thereby becomes larger than in the peripheral portions of the respective joining end portions 16, 17.

Since it is only necessary to preheat at least the joining end portion 16 of the roll barrel member 13 and the joining end portion 17 of the shaft material 14, preheating can be performed on part of the roll barrel member 13 that includes the joining end portion 16 or the entire roll barrel member 13, and part of the shaft material 14 that includes the joining end portion 17 or the entire shaft material 14.

Also, preheating can be performed only on the joining end portion 16 of the roll barrel member 13 or only on the joining end portion 17 of the shaft material 14 as needed. Additionally, an end face of at least one of the respective joining end portions 16, 17 of the core material 11 and the shaft material 14 can be preliminarily machined in the shape of a roughly circular arc, a chevron, a convex and the like in which the projection amount in the axial center direction in the central portion with respect to other parts (parts excluding the central portion) is larger by 0.1 mm to a few mm. In this case, a heating means capable of nearly evenly heating the joining end portion can be used.

Here, although a preheat temperature (the temperatures in the central portions of the respective joining end portions 16, 17 of the core material 11 and the shaft material 14) is not specifically limited as long as the roll barrel member 13 and the shaft material 14 become joined in good condition by the temperature, it is especially good to preheat at a temperature of 500 C.° or higher and a melting point of the shaft material 14 or lower.

When the preheat temperature is lower than 500 C.°, there is a possibility that the joint strength between a roll barrel member and a shaft material cannot be heightened enough since the temperature is too low. On the other hand, when the preheat temperature exceeds a melting point of a shaft material, there is a possibility that, for example, the shaft material becomes softened and the metallic structure changes, making the shaft material unusable as a shaft material.

Therefore, the preheat temperature is set at 500 C.° or higher and the melting point of the shaft material 14 or lower. However, it is preferred that the lower limit is 550 C.°, or even 600 C.°, and it is preferred that the upper limit is "the melting point of the shaft material 14 −50 C.°," or even "the melting point of the shaft material 14 −100 C.°."

After preheating is finished in this manner, the preheating means 31 located at the preheating position 45 is moved to the non-preheating position 46 by moving the carrying stand 49 of the moving means 47.

Next, descriptions will be given on the friction pressure welding process.

In the friction pressure welding process, the shaft material 14 is joined to the roll barrel member 13.

First, under a condition where the axial center of the shaft material 14 is aligned with the axial center of the core material 11 preheated in the above preheating process, by pressing the core material 11 to the shaft material 14 through the hydraulic cylinder 24 while rotating the chuck 23 (the shaft materials 14, 15) through the motor, the joining end portions 16, 17 of the core material 11 and the shaft material 14 become frictionally heated.

Here, the pressing force of the core material 11 and the rotating speed of the shaft material 14 are not specifically limited as long as frictional heating can be adequately performed. The pressing force is, for example, about 10 MPa or more and 40 MPa or less (preferably, the lower limit is 15 MPa and the upper limit is 30 MPa). The rotating speed is, for example, about 100 rpm (rounds/minute) or more and 500 rpm or less (preferably, the lower limit is 150 rpm and the upper limit is 300 rpm).

The core material 11 and the shaft material 14 thereby come into contact with each other beginning with the central portions thereof and become frictionally heated/melted (frictionally heated, and then melted), and the peripheral portions subsequently come into contact with each other and become frictionally melted. Thus, whole surefaces of the respective joining end portions 16, 17 of the core material 11 and the shaft material 14 become melted. As just described, by the frictional heating occurring gradually from the central portions toward the peripheral portions and by the melted metal playing, so to speak, a lubricant-esque role, a frictional torque between the core material 11 and the shaft material 14 is kept small, and a motor having small power can be used even when the diameters of the joining end portions 16, 17 are large.

After frictionally heating and melting the joining end portions 16, 17 of the core material 11 and the shaft material 14 as described above, the joining end portions 16, 17 of the core material 11 and the shaft material 14 become joined (upset) by strongly pressing the core material 11 to the shaft material 14 through the hydraulic cylinder 24 and stopping the rotation of the shaft material 14. More specifically, the metals melted by the frictional heating of the joining end portions 16, 17 of the core material 11 and the shaft material 14 become cooled/solidified (cooled and then solidified), and the core material 11 and the shaft material 14 consequently become solidly joined.

Here, the strong pressing of the core material 11 to the shaft material 14 after the frictional heating is not specifically limited as long as the joint strength between the core material 11 and the shaft material 14 can be heightened enough. However, the strong pressing force is more powerful than the above pressing force at the time of the frictional heating, and is, for example, about 20 MPa or more and 80 MPa or less (preferably, the lower limit is 30 MPa and the upper limit is 60 MPa).

Timing to stop the rotation of the shaft material 14 can be set by the amount of deformation caused by the softening (melting) of the joining end portions 16, 17 of the core material 11 and the shaft material 14 at the time of frictionally heating the joining end portions 16 and 17. However, the foregoing timing can also be set by the time having passed since the starting timing of the strong pressing in which the core material 11 is strongly pressed to the shaft material 14 (e.g., 5 seconds or less).

Lastly, descriptions will be given on the finishing process.

In the finishing process, finish processing is performed on a frictionally joined mill roll. First, a frictionally joined mill roll is roughly processed to a state close to a finished state. Then, thermal refining, i.e., heat treatment such as predetermined hardening and tempering, is performed. Next, by machining the thermally refined mill roll in a product shape appropriate to the intended use, the mill roll 10 is manufactured.

It is preferred to expose a metal surface by machining the interface of the roll barrel member 13 and the shaft material 14 after the earlier-described friction pressure welding process, and to perform circumferential welding (build-up welding) on the interface.

Additionally, as described above, it is preferred to perform an ultrasound examination on the interface after exposing the metal surface of the interface of the roll barrel member 13 and the shaft material 14 to examine whether the roll barrel member 13 and the shaft material 14 are joined in good condition or not (quality inspection).

Next, with reference to FIGS. 1 and 5, descriptions will be given on a method for manufacturing a mill roll according to the second embodiment of the present invention. This method is substantially the same as the method for manufacturing a mill roll according to the first embodiment of the present invention described earlier except for the usage of the manufacturing apparatus of a mill roll 60, therefore, descriptions will be given only on the different parts.

First, descriptions will be given on the preparatory process.

The roll barrel member 13 and the shaft materials 14, 15 prepared in the method for manufacturing a mill roll according to the first embodiment of the present invention described earlier are carried to the manufacturing apparatus of a mill roll 60, the clamp 62 is made to hold the roll barrel member 13, and the chuck 63 is made to hold the shaft material 14 (the same applies to the shaft material 15).

Then, the relative position of the clamp 62 and the chuck 63 is adjusted in order to make the axial center of the core material 11 of the roll barrel member 13 and the axial center of the shaft material 14 aligned with each other.

Next, descriptions will be given on the preheating process.

In the preheating process, as shown in the method for manufacturing a mill roll according to the first embodiment described earlier, by the earlier-described preheating means, the joining end portion 16 of the roll barrel member 13 and the joining end portion 17 of the shaft material 14 (or the shaft material 15, the same applies hereafter) are preheated to a pre-set temperature.

Next, descriptions will be given on the friction pressure welding process.

First, under a condition where the axial center of the shaft material 14 is aligned with the axial center of the core material 11 preheated in the above preheating process, by rotating the chuck 63 (the shaft materials 14, 15) through a motor while pressing the shaft material 14 to the core material 11 through a pressing means, the joining end portions 16, 17 of the core material 11 and the shaft material 14 become frictionally heated.

The pressing force of the core material 11 shown in the method for manufacturing a mill roll according to the first embodiment described earlier can be applied as a pressing force of the shaft material 14.

As described above, after frictionally heating the joining end portions 16, 17 of the core material 11 and the shaft material 14, the core material 11 and the shaft material 14 become joined by strongly pressing the shaft material 14 to the core material 11 through the pressing means and stopping the rotation of the shaft material 14. The strong pressing force of the core material 11 shown in the method for manufacturing a mill roll according to the first embodiment described earlier can be applied as a strong pressing force of the shaft material 14.

Lastly, descriptions will be given on the finishing process.

By performing finish processing on a mill roll frictionally joined by the method shown in the method for manufacturing a mill roll according to the first embodiment described earlier, the mill roll 10 is manufactured. It is preferred to expose a metal surface by machining the interface of the roll barrel member 13 and the shaft material 14 and to perform circumferential welding (build-up welding) on the interface after the earlier-described friction pressure welding process. It is also preferred to perform an ultrasound examination on the interface after exposing the metal surface of the interface in order to examine whether the roll barrel member 13 and the shaft material 14 are joined in good condition or not (quality inspection).

Next, with reference to FIGS. 6(A) to 6(C) and 7, descriptions will be given on a different example of the preheating means used in the preheating process. This preheating means includes a robot arm (it is preferred to use a 6-axis polyarticular robot) 65 and a burner 67, the robot arm 65 having a well-known structure, the burner 67 being attached to the tip portion of an arm 66 of the robot arm 65. The robot arm 65 includes an unillustrated control part, determines the direction and movement locus of the burner 67 in accordance with a program input into the control part, and is capable of arranging the burner 67 at arbitrary position in arbitrary direction. The burner 67 has a water-cooling structure, and is made not to be heated by the heat given off by the burner 67 itself. The arm 66 of the robot arm 65 can also be water-cooled as needed.

Therefore, by operating the robot arm 65, the burner 67 is normally arranged at the standby position, however, when preheating the joining end portion 16 (the same applies to 18) of the roll barrel member 13 and the joining end portion 17 (the same applies to 19) of the shaft material 14 (the same applies to 15), an adequate interspace is provided in between the joining end portion 16 of the roll barrel member 13 and the joining end portion 17 of the shaft material 14, and the burner 67 is arranged at the middle position of this interspace. Then, by delivering inflammable gas (e.g., LPG, LNG) and oxygen (or air) to the burner 67, the burner 67 becomes lit. The number 69 indicates a water jacket.

Next, by operating the robot arm 65, the burner 67 is directed to the joining end portion 16 in order for the flame of the burner 67 to spirally heat the joining end portion 16. After finishing heating the joining end portion 16, the burner 67 is rotated by 180 degrees in order to spirally heat the joining end portion 17.

Figure 6A:
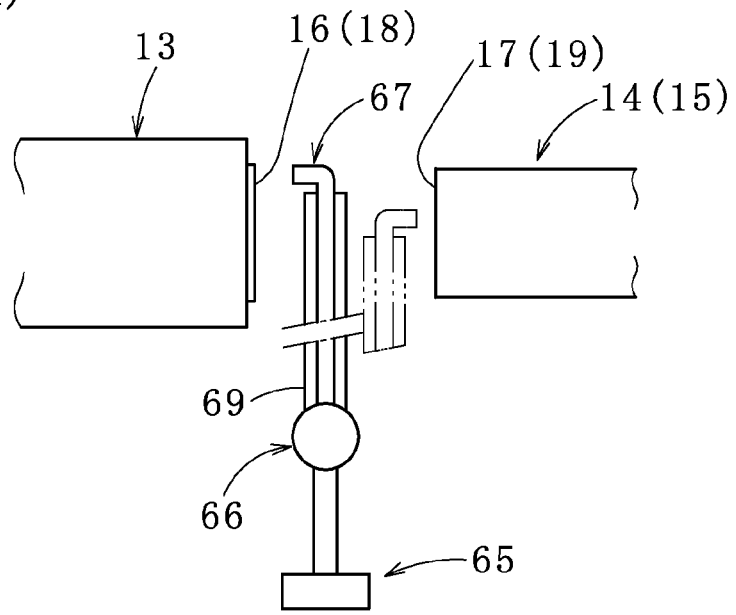
FIGS. 6(A) to 6(C) are explanatory diagrams of a preheating means used for the present invention.
Figure 6B:
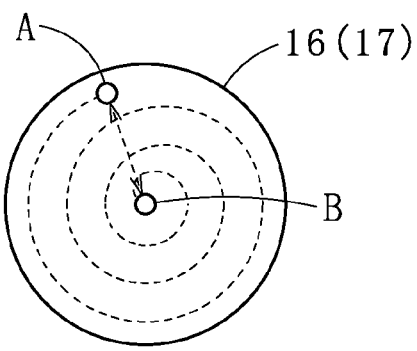

As to the spiral motion of the burner 67, the burner 67 may spirally move from A to B in FIG. 6(B) (i.e., from the outer circumference to the center side), and may also spirally move from B to A in FIG. 6(B).

Figure 6C:
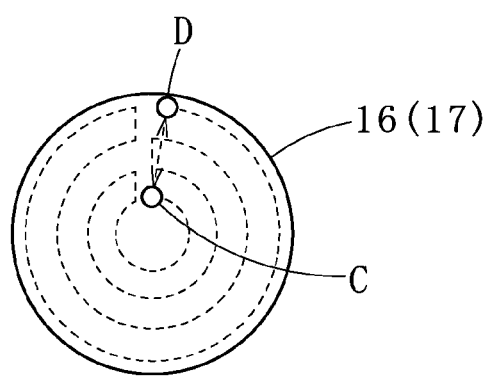

Additionally, as illustrated in D to C or C to D in FIG. 6(C), it is possible for the burner 67 to move on a circle having a different diameter.

Figure 7:
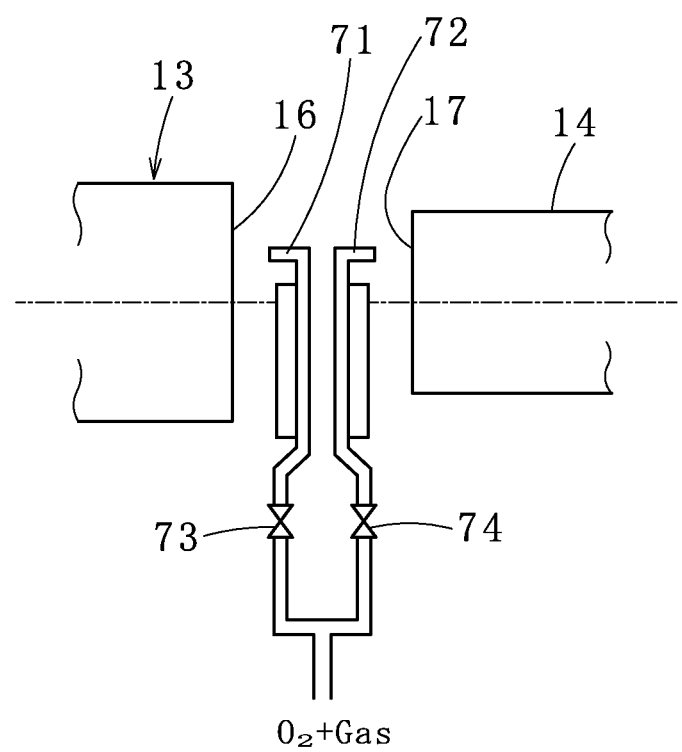
FIG. 7 is an explanatory diagram of a different preheating means used for the present invention.

Also, when using a single burner 67, it is necessary to change the flame blowing direction of the burner 67 from one joining end portion 16 to the other joining end portion 17 in a short period of time. Thus, as illustrated in FIG. 7, by arranging first and second burners 71, 72 composing a burner back to back (angles differing by 180 degrees) and making both the first and second burners 71, 72 give off flame, both of the joining end portions 16, 17 can also be simultaneously heated.

Here, when the diameters of the joining end portions 16 and 17 are different, it is preferred to provide valves 73, 74 for both the first and second burners 71, 72. In the case of partial non-use of the second burner 72 with respect to the small-diameter joining end portion 17, by turning off the valve 74, the joining end portion 17 can be non-heated. These first and second burners 71, 72 are provided at the tip of an arm of an unillustrated robot arm.

By using the methods for manufacturing a mill roll of the present invention described above, a mill roll can be manufactured in a shortened work period and at a low cost, and an ever-longer life of a mill roll can be achieved.

The descriptions have been given on the present invention hereinbefore with reference to the embodiments, however, the present invention is not limited to the structures described in the above embodiments, and includes other embodiments and variations conceivable within the scope of matters in the claims. For example, the scope of right of the present invention includes cases where a method for manufacturing a mill roll, a mill roll and a manufacturing apparatus of a mill roll of the present invention are composed of combinations of part or all of the respective earlier-described embodiments and variations.

INDUSTRIAL APPLICABILITY

In the method for manufacturing a mill roll, the mill roll and the manufacturing apparatus of a mill roll according to the present invention, since a roll barrel member and a shaft material are joined by a preheating process and a friction pressure welding process, material costs can be cut down, and a higher-precision mill roll can be manufactured by a method that is easier than ever before.

REFERENCE SIGNS LIST

10: mill roll, 11: core material, 12: tinkering hardfacing layer, 13: roll barrel member, 14, 15: shaft material, 16, 17, 18, 19: joining end portion, 20: manufacturing apparatus of a mill roll, 21: base stand, 22: clamp, 23: chuck (second holding means), 24: hydraulic cylinder (pressing means), 25, 26: supporting stand, 27: steady rest means, 28: table, 29: first holding means, 30: connecting rod, 31: preheating means, 32: burner, 33: water-cooling means, 34, 35: water-cooling jacket, 36: mounting stand, 37, 38: pipe arrangement, 39, 40: heat-resistant plate (heat-resistant member), 41: opening portion, 42: gas supply tube, 43, 44: gas supply chamber, 45: preheating position, 46: non-preheating position, 47: moving means, 48: guide rail, 49: carrying stand, 50: gas supply hose, 51: carriage, 52: guide roller, 53: floor surface, 60: manufacturing apparatus of a mill roll, 61: base stand, 62: clamp (first holding means), 63: chuck (second holding means), 65: robot arm, 66: arm, 67: burner, 69: water jacket, 71, 72: burner, 73, 74: valve

The invention claimed is:

1. A method for manufacturing a mill roll, comprising:
  a roll barrel member having a hard hardfacing layer formed on an outer circumference of a columnar core material consisting of chromium-molybdenum steel or carbon steel; and
  shaft materials consisting of chromium-molybdenum steel and being singly provided on both sides in an axial direction of the core material, wherein diameters of joining end portions of the shaft materials are made smaller than a diameter of the core material, the method for manufacturing a mill roll further comprising:
  a preheating process for preheating either one or both of at least joining end portions of the roll barrel member and the joining end portions of the shaft materials to a pre-set temperature; and a friction pressure welding process for, with axial centers of the shaft materials aligned with an axial center of the core material, joining the core material and the shaft materials by strongly pressing the shaft materials to the core material after fractionally heating the joining end portions of the core material and the shaft materials by rotating the shaft materials while pressing the shaft materials to the core material.

2. The method for manufacturing a mill roll according to claim 1, wherein a preheat temperature for the joining end portions in the preheating process is 500° C. or higher and a melting point of the shaft materials or lower.

3. The method for manufacturing a mill roll according to claim 2, wherein the diameters of the joining end portions of the shaft materials are 86% or more and 96% or less of the diameter of the core material.

4. The method for manufacturing a mill roll according to claim 2, wherein
the core material projects from end portions of the roll barrel member.

5. The method for manufacturing a mill roll according to claim 1, wherein
after the friction pressure welding process, a metal surface is exposed by machining interfaces of the roll barrel member and the shaft materials, and circumferential welding is performed on the interfaces.

6. The method for manufacturing a mill roll according to claim 1, wherein a used roll having the new hardfacing layer formed on the outer circumference of the roll barrel member is used as the roll barrel member.

7. The method for manufacturing a mill roll according to claim 6, wherein the hardfacing layer on the outer circumference is partially or entirely removed from the used roll by machining after annealing.

\* \* \* \* \*